Oct. 21, 1969 JAMES E. WEBB 3,474,328
ADMINISTRATOR OF THE NATIONAL AERONAUTICS
AND SPACE ADMINISTRATION
VARIABLE FREQUENCY NUCLEAR MAGNETIC RESONANCE SPECTROMETER
Filed April 18, 1967 2 Sheets-Sheet 1
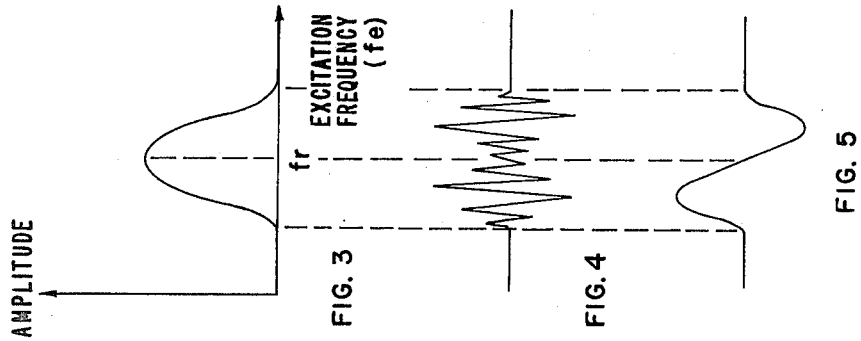
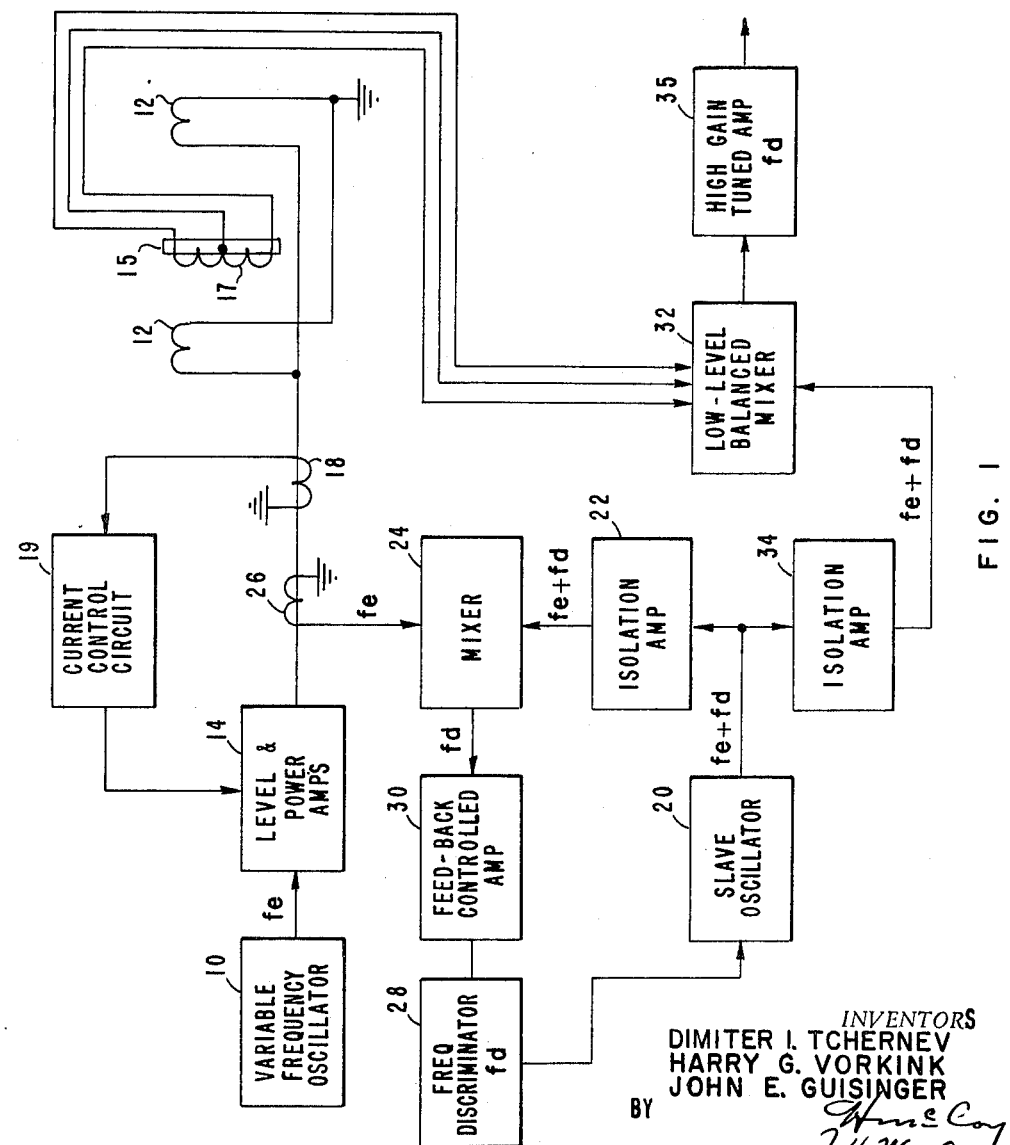
INVENTORS
DIMITER I. TCHERNEV
HARRY G. VORKINK
JOHN E. GUISINGER
BY
ATTORNEYS

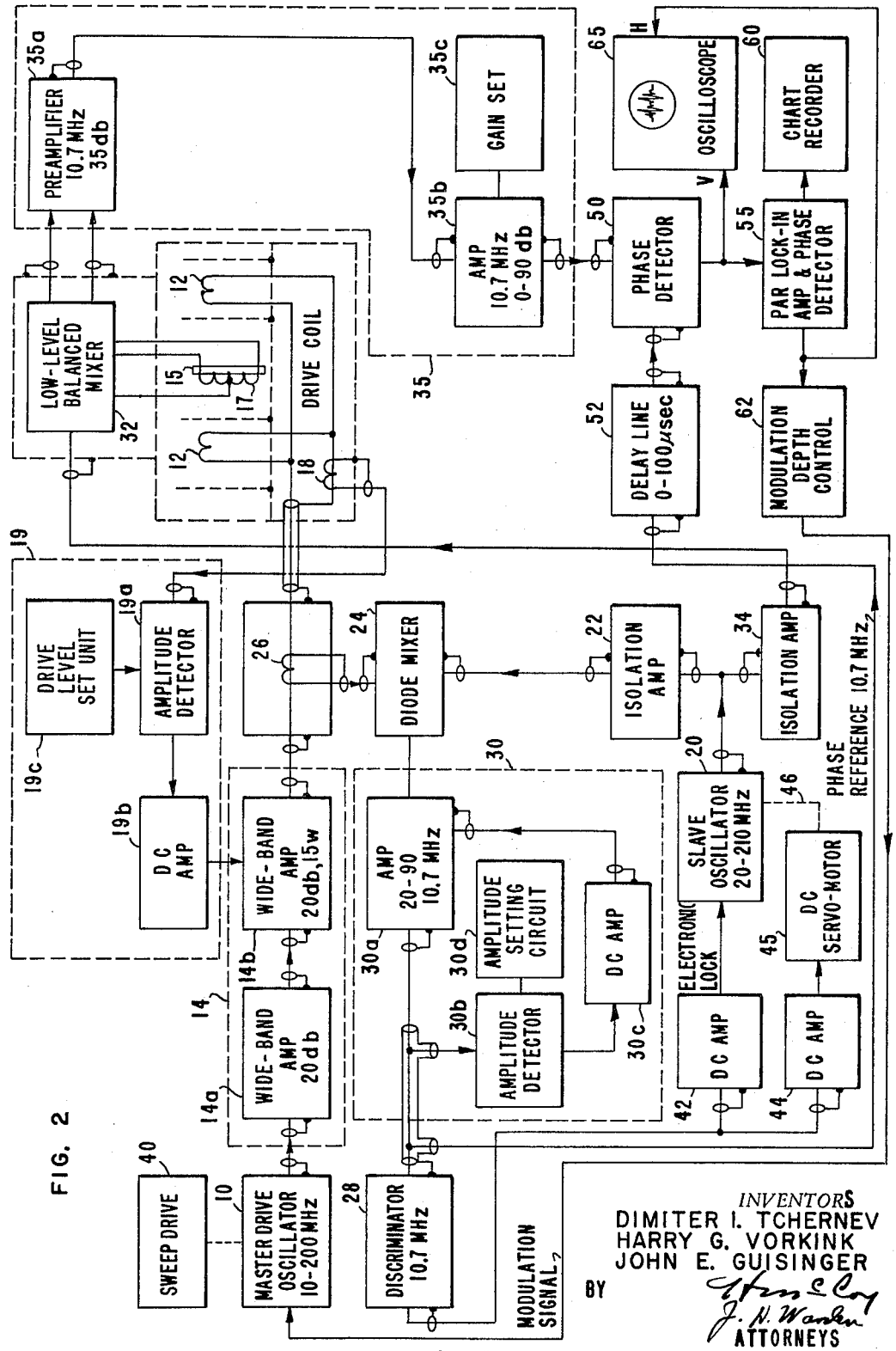

United States Patent Office 3,474,328
Patented Oct. 21, 1969

3,474,328
VARIABLE FREQUENCY NUCLEAR MAGNETIC RESONANCE SPECTROMETER
James E. Webb, Administrator of the National Aeronautics and Space Administration, with respect to an invention of Dimiter I. Tchernev, La Canada, Harry G. Vorkink, Arcadia, and John E. Guisinger, Altadena, Calif.
Filed Apr. 18, 1967, Ser. No. 632,165
Int. Cl. G01n 27/00, 23/00; G01r 33/08
U.S. Cl. 324—0.5                                     14 Claims

ABSTRACT OF THE DISCLOSURE

A nuclear magnetic resonance spectrometer with a variable frequency master drive source providing drive signals over a relatively wide frequency range. A slave oscillator is frequency locked to the master drive source to provide a frequency output which is a fixed frequency difference above the drive varying frequency. The outputs of the drive source and the slave oscillator are heterodyned in a first loop to provide the frequency difference used to control the slave oscillator. The output of the slave oscillator is also heterodyned in a second loop with the induced frequency to provide the frequency difference which is amplified in a high gain amplification arrangement tuned to the frequency difference rather than to the varying frequency of the drive source. The frequency differences produced in the two heterodyning loops are phase detected to minimize noise effects.

ORIGIN OF INVENTION

The invention described herein was made in the performance of work under a NASA contract and is subject to the provisions of Section 305 of the National Aeronautics and Space Act of 1958, Public Law 85–568 (72 Stat. 435; 42 USC 4257).

BACKGROUND OF THE INVENTION

Field of the invention

This invention generally relates to spectrometers and, more particularly, to an improved nuclear magnetic resonance (NMR) spectrometer with a variable frequency driving source.

Description of the prior art

In recent years various spectrometers, based on NMR phenomenon have been proposed, with some actually built and available commercially. Nearly all present day NMR spectrometers of the nuclear induction type have certain common features. These include, a sample holder about which a pickup coil is wound, with a primary magnetic field being provided about the sample holder. Also, a radio frequency (RF) magnetic field is provided by RF signals in drive windings oriented perpendicular to the pickup coil.

Theoretically, nuclei of certain matter may be brought into magnetic resonance by adjusting either the primary magnetic field or the RF frequency. Even when at resonance, the RF frequency signal induced in the pickup coil is very small. This signal must therefore be greatly amplified, about 100 db, before it can be used for analysis or display. Because of the amplification requirements, all prior art, practical NMR spectrometers employ a fixed RF driving source and thereby limit the amplification of the induced signal to a fixed known frequency. It is the primary magnetic field which is adjusted to produce magnetic resonance.

Although prior art NMR spectrometers have been found to be extremely useful research tools in many fields of science and engineering, they cannot be used to study the nuclear magnetic resonance characteristics of certain materials, such as ferromagnetic particles. These materials possess their own primary magnetic field and therefore their NMR characteristics could only be studied by varying the RF drive field over a relatively wide frequency range, and by accurately amplifying the induced signals over such a wide frequency range. Thus, a need exists for an accurate variable frequency NMR spectrometer.

OBJECTS AND SUMMARY OF THE INVENTION

Accordingly, it is a primary object of this invention to provide a new improved NMR spectrometer.

Another object is to provide an improved NMR spectrometer in which the frequency of the driving RF signals is variable over a relatively wide frequency range.

A further object is to provide a variable frequency NMR spectrometer with improved signal-to-noise ratio.

Still a further object of this invention is to provide a variable frequency NMR spectrometer with simplified induced-signal amplification circuitry and improved signal-to-noise ratio.

These and other objects of the invention are achieved by providing a NMR spectrometer in which the RF driving signals are provided from a variable frequency master drive oscillator. A slave oscillator is frequency locked to the master drive oscillator to provide signals at a frequency which differs by a fixed frequency difference from the frequency of signals from the master drive oscillator. Thus, both signals frequencies vary in unison. The induced signals in the pickup coil, which are of maximum amplitude when the driving frequency corresponds to the NMR frequency of the nuclei in the sample holder are mixed in a low-level balanced mixer with the signals from the slave oscillator.

Since the induced frequency is that of the drive oscillator, the output frequency of the mixer is that of the frequency difference. This output is applied to a high gain amplification arrangement which is tunable to a narrow band about the frequency difference, rather than over the wide frequency range of the master drive oscillator. Thus, the amplification problem is greatly minimized. The output of the amplification arrangement and an output signal from the frequency locked loop arrangement, used to lock the slave oscillator frequency to that of the master drive oscillator, are used to minimize the effects of noise on the output of the amplification arrangement, thereby improving the spectrometer's output signal-to-noise ratio.

The novel features that are considered characteristic of this invention are set forth with particularity in the ap-

BRIEF DESCRIPTION OF THE DRAWINGS pended claims. The invention will best be understood from the following description when read in connection with the accompanying drawings.

FIGURE 1 is a simplified block diagram of the invention;

FIGURE 2 is a detailed block diagram of a specific spectrometer of the invention actually reduced to practice; and FIGURES 3, 4 and 5 are simple waveform diagrams, useful in explaining certain aspects of the invention.

DESCRIPTION OF THE PREFERRED EMBODIMENTS

Reference is now made to FIGURE 1 which is a simplified block diagram of an exemplary embodiment of the present invention. The spectrometer of the invention includes a variable frequency oscillator 10 connected to a pair of drive coils 12, through level and power amplifiers, generally represented by block 14. The drive coils 12 are positioned on opposite sides of a sample holder 15, about which a pickup coil 17 is wound. Such arrangements are well known in the art of nuclear magnetic resonance spectrometers.

Basically, the output of oscillator 10, which is assumed to vary over a relatively wide frequency band in the radio frequency range, is amplified, both level-wise and power-wise in amplifiers 14 and supplied as a current in the drive coils 12 to induce an RF magnetic field about sample holder 15. The field varies as a function of the frequency of the output of oscillator 10 which, for explanatory purposes, is designated in FIGURE 1 as $f_e$.

Since the impedance of the drive coils 12 varies with changes in the frequency of the output of oscillator 10, in order to maintain an RF magnetic field of constant magnetizing force about sample holder 15, it is necessary to adjust the current, in the coils 12 supplied by amplifiers 14. This is accomplished by monitoring the current with a current transformer 18, connected to a current control circuit 19, whose output is then used to control the current output of amplifiers 14. The current transformer 18 and the current control circuit 19 may be thought of as a current-control feedback loop designed to adjust the current, so that irrespective of changes in the impedance of the drive coils 12, due to changes in the frequency output of oscillator 10, the field of the magnetic force remains constant.

The spectrometer of the present invention, in addition to the variable frequency oscillator 10, which hereafter may also be referred to as the master drive oscillator, includes a slave oscillator 20. The function of this oscillator is to provide an output at a fixed frequency above the output frequency of oscillator 10. In FIGURE 1, the desired output frequency of oscillator 20 is designated as $f_e + f_d$ where $f_e$ represents the actual output frequency of oscillator 10 and $f_d$ the desired frequency difference between the output frequencies of the two oscillators. However, since the frequency of oscillator 10 ($f_e$) is not fixed but rather one that varies, it is appreciated that the oscillator 20 must be controlled to adjust its output frequency to correspond to the frequency changes of oscillator 10.

Such control is provided by supplying the output frequency of oscillator 20, through an isolation amplifier 22, to a mixer 24. The latter-mentioned circuit is also provided with the actual output frequency $f_e$ of oscillator 10 by means of a current transformer 26, which monitors the frequency of the current supplied to coils 12. Mixer 24 mixes the frequencies supplied thereto, in manners well known in the art, to provide an output whose frequency represents the difference of the mixer's input frequencies. The output of mixer 24 is applied to a frequency discriminator 28, through a feedback controlled amplifier 30. The output of discriminator 28 is a DC signal with a polarity and amplitude which respectively depend on the direction and magnitude of deviation of the output frequency of mixer 24 from the frequency difference $f_d$. In order to make the output of the discriminator independent of the amplitude of the signal from amplifier 30, the latter-mentioned amplifier includes a feedback loop which maintains its output amplitude fixed, while the output frequency is dependent on the frequency received from mixer 24.

The error signal from discriminator 28, i.e., the level and polarity of the DC signal, is used to control the slave oscillator 20 so that its frequency is $f_d$ above the frequency of oscillator 10. Thus, mixer 24, transformer 26, discriminator 28, and amplifier 30 may be thought of as a frequency lock loop, designed to maintain the output frequency of oscillator 20 above the varying output frequency $f_e$ by a frequency difference of $f_d$.

As is appreciated, by those familiar with the art of nuclear magnetic resonance spectrometers, when coils 12 are accurately positioned perpendicular to pickup coil 17 and the driving frequency induced in drive coils 12 corresponds to the magnetic resonance frequency of the material in the sample holder 15, signals of the driving frequency are induced in the pickup coil 17, which in FIGURE 1 is shown connected to one input of a low-level balanced mixer 32. The other input of mixer 32 is connected to the output of slave oscillator 20 through an isolation amplifier 34. The output of mixer 32 is supplied to a high gain amplifier 35 which is tuned to a narrow frequency band about a center frequency $f_d$.

It should be appreciated that in the absence of slave oscillator 20 and mixer 32, because of the variable frequency nature of the output of the master drive oscillator 10, amplifier 34 would have had to be tuned to a varying frequency and remain tuned while the driving frequency of oscillator 10 is varied. For example, if the frequency of oscillator 10 could vary over a frequency band of several hundred megahertz (mHz.) the amplifier 35 would have had to be tunable to any of the frequencies within this range. Constructing such an amplifier and maintaining it accurately tuned over such a frequency range is most difficult with the present state of the art. However, by employing the output frequency of slave oscillator 20, which when properly locked to the frequency of oscillator 10, provides a frequency $f_e + f_d$, where $f_e$ represents the excitation or drive frequency, and by heterodyning the output frequency of the slave oscillator with the picked up frequency $f_e$, the amplifier 35 need be tuned to the difference frequency $f_d$ and therefore is independent of the actual frequency of oscillator 10 which is variable over a large frequency range. Thus, the construction and complexity of amplifier 35 is greatly reduced since high gain amplifiers tunable to a narrow bandwidth are presently commercially available. Consequently, even though the amplifier 35 is not tuned to the actual variable excitation frequency ($f_e$), its output is an accurate measure of the resonance frequency of the material in the sample holder 15, and therefore may be used to determine various modes of the nuclear magnetic resonance of the material which is being tested, in manners well known in the art.

Reference is now made to FIGURE 2 which is a detailed block diagram of a specific exemplary embodiment of the invention, actually reduced to practice. FIGURE 2 is useful to further explain previously discussed, as well as additional novel features of the invention. Therein elements, similar to those shown in FIGURE 1, are designated by like numerals. It should be appreciated that although in FIGURE 2 specific frequency ranges and values are designated they are presented as exemplary of the invention, rather than as a limitation thereof.

The variable frequency oscillator 10 is designated as the master drive oscillator, capable of providing output signals in the frequency range from 10 to 200 mHz., which for the purposes of this application is assumed to represent a wide frequency range. Its output is amplified by two wide-band distributed amplifiers 14a and 14b, enclosed in dashed block 14. Amplifier 14a is a voltage or level amplifier with a selected gain such as 20 db, while amplifier 14b is a power amplifier, whose current output drives coils 12.

In FIGURE 2, details of the current control circuit 19, used to keep the current from amplifier 14b constant in order to maintain a constant driving magnetic field is shown. It includes an amplitude detector 19a which responds to the current in the current transformer 18, to control a DC amplifier 19b, whose output in turn controls power amplifier 14b to provide a constant output current. The desired current drive level may be controlled by a drive level set unit 19c. The master drive oscillator 10 may be swept by a constant speed mechanical drive 40. The sweep speed may be varied, for example from a few kHz./second to about 2 mHz./second.

Relating the designations of the frequency of master drive oscillator 10 in both figures, $f_e$ represent a frequency in the range from 10 to 200 mHz. In the arrangement shown in FIGURE 2, $f_d$ is assumed to be +10.7 mHz. Thus, when oscillator 20 is properly slaved to oscillator 10, its output frequency is 10.7 mHz. above the drive frequency. Oscillator 20 is diagrammed as one covering the range of 20 to 210 mHz. Its frequency is controlled by mixing it in a diode mixer 24 with the drive frequency as sensed by transformer 26 and then supplying the frequency difference to the feedback controlled amplifier 30.

In FIGURE 2, amplifier 30 is shown including an amplifier 30a, tuned to the frequency difference of 10.7 mHz., whose output amplitude is fed to an amplitude detector 30b which controls the amplifier's output to be frequency independent through a DC amplifier 30c. The output of amplifier 30a may be set to any fixed value, for example 1 volt by an amplitude setting circuit 30d. Circuits 30b, 30c and 30d may be thought of as a closed feedback loop to maintain the amplitude of the output of amplifier 30a constant, for example at 1 volt. The constant amplitude output of amplifier 30a is supplied to the 10.7 mHz. frequency discriminator 28. Its output is a DC signal with polarity and amplitude depending on the deviation of the difference signal from 10.7 mHz.

The error signal from discriminator 28 may be split in two parts. One part may be amplified in a DC amplifier 42 and used to electrically control the frequency of the oscillator with a time constant of 0.1 second. The range of this control would depend on the actual frequency of the slave oscillator and is in general for the described example of the order of 5 mHz. The second part of the error signal from the discriminator 28 may be amplified by a DC amplifier 44 to drive a DC servomotor 45 whose output is mechanically coupled to the tuning shaft of the oscillator 20, as indicated by dashed line 46. In this manner the electrical locking from amplifier 42 provides fast and fine frequency correction, while the mechanical coupling permits coverage of the entire frequency band of interest. It has been found that with commercially available circuits, once the two oscillators are locked at 10.7 mHz. apart, they can remain locked within a 500 cycle accuracy while their normal frequency varies over a factor of 10.

As is appreciated, the frequency induced in pickup coil 17 is the excitation or drive frequency with the output of the coil reaching a maximum at the magnetic resonance frequency of the nuclei of the sample. The output, however, even when reaching a maximum is extremely small and therefore must be greatly amplified. Signal gain of $10^8$ times is not uncommon. Because of the variable frequency nature of the driving frequency ($f_e$), in the absence of the present invention, it would have been necessary to construct high gain tuned amplifiers with variable frequency and have them remain tuned while the driving frequency is swept. Accomplishing it would have been most difficult and expensive. However, by mixing the excited frequency with the frequency of the slave oscillator 20, in accordance with this invention, the need for such tuned amplifiers is eliminated.

This is accomplished by mixing the frequency, excited in the pickup coil 17 with the slave oscillator 20 frequency in the low-level balanced mixer 32 and amplifying the resulting difference frequency in a tuned preamplifier of 35a of fixed gain which forms part of an amplifying arrangement 35. The low-level balanced mixer 32 and the preamplifier 35a are preferably located near the pickup coil 17 to minimize the length of the leads which carry very low level signals.

Mixer 32 is of the balanced type to minimize the difficulties encountered when very low level signals, for example 100 nanovolts, induced in pickup coil are mixed with signals $10^7$ times larger, such as are supplied by slave oscillator 20. Unless a balanced mixer is used, any small variations in the large signals would be amplified and detected as noise. Also, hum and other types of amplitude modulation of the slave oscillator will also be present in the difference-frequency and may totally mask the small desired signal. However, by using a balanced mixer, such variations and modulations are cancelled while the incoming signal is doubled. Also, by using the balanced mixer the effect of coupling, due to the geometric configuration of the leads of the pickup coil, is greatly minimized.

It should be appreciated that at the NMR frequency, the output of the balanced mixer 32 is 10.7 mHz. since the frequency from the slave oscillator is 10.7 mHz. above the excitation or drive frequency induced in the pickup coil 17. Thus, preamplifier 35a may be narrowly tuned to 10.7 mHz. Its 10.7 mHz. output is amplified in a main tuned amplifier 35b whose gain may be controlled by a gain set unit 35c to be 0 to 90 db.

It should be pointed ou that even though the frequency of slave oscillator 20 may be locked to be 10.7 mHz. above the frequency of oscillator 10 only to within several hundred cycles, the actual frequency of oscillator 20 is mixed in both mixer 24 and mixer 32 with signals of the identical frequency. Thus, identical frequencies are mixed in both mixers and therefore the outputs of amplifier 35b and amplifier 30 are of the identical frequency. This is most useful in improving the system's signal-to-noise ratio by means of a phase detector 50 having one input connected directly to the output of amplifier 35b and another to amplifier 30a through a variable delay drive 52, whose upper delay limit corresponds to the period of one cycle of the frequency difference. In the present example, the maximum delay is $0.1\mu$ seconds since the frequency difference is 10.7 mHz. By adjusting the delay of unit 52 the output of detector 50 is nulled, in the absence of the NMR frequency, thereby minimizing the effect of noise on the signal received at the output of the detector at resonance.

In the absence of modulation of the drive oscillator 10, the output of detector 50 is a DC signal of maximum amplitude at the NMR frequency. Such an output which may represent either the absorption line or the dispersion line is diagrammed in FIGURE 3 wherein the ordinate designates amplitude, the abscissa drive frequency and $f_r$ the resonance frequency of a sample.

Preferably, the drive oscillator 10 is modulated by signals up to 100 kHz. so that the output of the detector 50 includes an AC output component as diagrammed in FIG. 4. The amplitudes of the signals correspond to the rate of change of the DC output component, with the phase of the signals changing by 180° at the resonant frequency $f_r$.

The AC component is preferably supplied to a locked-in and phase-sensitive detector 55 whose output representing the derivative of the absorption or dispersion line as diagrammed in FIGURE 5, may be recorded on a strip-chart recorder 60. Such lock-in amplifier and detectors are known in the art being commercially available. One type for example is model JB-5 of Princeton Applied Research. The local oscillator included in the circuit 55 may be used to provide the modulating frequency for oscillator 10 through a modulation depth control 62.

It has been found that by utilizing the derivative of the absorption or dispersion line output of the lock-in amplifier and phase detector 55, an additional improvement of signal-to-noise ratio of over 100 times (40 db) can be obtained. If desired, the output of the phase detector and the modulating frequency may be supplied to the vertical (V) and horizontal (H) inputs of an oscilloscope 65 to display the phase detector 50 output thereon. It should be noted that in prior art spectrometers, with fixed RF drive, small inaccuracies in the proper perpendicular alignment of the drive coils, with respect to the pickup coil, can be electronically compensated for. However, in the spectrometer of this invention, due to the variable frequency feature, such electronic compensation is not practical and therefore the coils must be physically positioned, perpendicular to one another to a high degree of accuracy.

Summarizing the foregoing description, in the NMR spectrometer of this invention, the driving signals are supplied from a master drive oscillator at a frequency varying over a relatively large frequency range. Frequency-locked to this source is a slave oscillator whose frequency is maintained at a fixed frequency difference from the master drive oscillator frequency. This is accomplished in a frequency lock loop with a first mixing or heterodyning arrangement. The frequency induced at magnetic resonance is heterodyned with the frequency of the slave oscillator in a second heterodyning arrangement, whose output frequency is the same as that produced in the first heterodyning arrangement. Even though the induced frequency may vary over a wide range, since it is mixed with the frequency of the slave oscillator, the difference is fixed so that it can be greatly amplified in an amplification arrangement, which need be tuned only to the frequency difference. Also, since in both heterodyning arrangements, the same frequencies are mixed, their outputs are of identical frequency so that they can be phase related to minimize the effect of noise in the greatly amplified induced frequency.

We claim:

1. A nuclear magnetic resonance spectrometer comprising:
    a sample holder for holding a sample therein;
    a pickup coil wound about said sample holder;
    drive windings perpendicularly disposed with respect to said pickup coil;
    a first source of signals of a frequency variable over a selected wide frequency range, coupled to said drive windings to induce a field about said sample holder, said first source including frequency sweep means to produce a resonance spectrum for said sample;
    a second source of variable frequency signals frequency locked to said first source to provide signals at a fixed frequency difference from the frequency of signals from said first source; and
    a first signal mixer for mixing the signals from said second source with signals induced in said pickup coil, to provide an output signal of a frequency which is identical to said fixed frequency difference and of an amplitude which is a function of the resonant state of said sample.

2. The nuclear magnetic resonance spectrometer as described in claim 1 wherein said second source is locked to said first source by frequency lock loop means including a second signal mixer to which signals from said first and second sources are applied and frequency discriminating means responsive to the output frequency of said second mixer to control the frequency of said second source to vary with the frequency of said first source so that the output frequency of said second mixer is substantially equal to a fixed predetermined frequency difference.

3. The nuclear magnetic resonance spectrometer as described in claim 2 further including means to control the power characteristics of the signals supplied to said drive windings from said first source so that the field produced by said drive windings is substantially constant over the frequency range of said first source.

4. The nuclear magnetic resonance spectrometer as recited in claim 3 wherein said first source provides signals of a frequency variable over a range of substantially several hundred megahertz.

5. The nuclear magnetic resonance spectrometer as described in claim 2 wherein said first mixer is a low-level balanced mixer responsive to the signals from said second source and the signals induced in said pickup coil.

6. The nuclear magnetic resonance spectrometer as described in claim 5 further including means to control the power characteristics of the signal supplied to said drive windings from said first source so that the field produced by said drive windings is substantially constant over the frequency range of said first source.

7. The nuclear magnetic resonance spectrometer as described in claim 5 further including high gain amplifying means tunable to a relatively narrow frequency band about the frequency of the signals from said first low-level balanced mixer to amplify the signals therein.

8. The nuclear magnetic resonance spectrometer as described in claim 7 further including means to control the power characteristics of the signals supplied to said drive windings from said first source so that the field produced by said drive windings is substantially constant over the frequency range of said first source.

9. The nuclear magnetic resonance spectrometer as described in claim 8 further including variable delay means responsive to the output of said second mixer and phase detecting means for relating the phases of signals from said variable delay means and the amplified signals from said tunable amplifying means.

10. The nuclear magnetic resonance spectrometer as described in claim 9 wherein said first source provides signals of a frequency which varies from about 10 megahertz to about 200 megahertz.

11. In a nuclear magnetic resonance spectrometer of the type including a pickup coil wound about a sample holder holding a sample therein, and drive coils for producing a radio frequency magnetic field about said sample holder, the improvement comprising:
    a variable frequency master drive oscillator including oscillator means sweep means coupled to drive said drive coils with current of a frequency variable over a relatively wide range including the resonance frequency of said sample, to provide for said sample a resonance spectrum;
    a variable frequency slave oscillator;
    means for frequency locking said slave oscillator to be within a preselected fixed frequency difference from the actual frequency of said master drive oscillator; and
    first mixing means to which a frequency induced in said pickup coil and the frequency from said slave oscillator are applied to provide an output signal of a frequency which is identical to said fixed frequency difference and has an amplitude which is a function of the state of resonance of said sample.

12. The nuclear magnetic resonance spectrometer as recited in claim 11 wherein said frequency locking means includes second mixing means to which the output frequencies of said master drive oscillator and the slave oscillator are applied for providing an output at a frequency which is the difference of the two frequencies supplied thereto, and a frequency discriminator responsive to the output frequency of said second mixing means for controlling the frequency of said slave oscillator so that the output frequency of said second mixing means is substantially equal to said preselected frequency difference.

13. The nuclear magnetic resonance spectrometer as recited in claim 12 further including variable delay means and phase detecting means for relating the phases of the outputs of said first and second mixing means.

14. The nuclear magnetic resonance spectrometer as recited in claim 13 wherein the wide frequency range is about 200 megahertz and the maximum delay providable by said variable delay means is equal to about the period of one cycle of a signal at said frequency difference.

References Cited

UNITED STATES PATENTS

| | | | |
|---|---|---|---|
| 3,110,858 | 11/1963 | Arnold | 324—0.5 |
| 3,137,813 | 6/1964 | Kroon | 324—0.5 |
| 3,350,633 | 10/1967 | Hyde | 324—0.5 |

RUDOLPH V. ROLINEC, Primary Examiner

M. J. LYNCH, Assistant Examiner